United States Patent [19]
Washington

[11] Patent Number: 5,860,116
[45] Date of Patent: Jan. 12, 1999

[54] MEMORY PAGE LOCATION CONTROL FOR MULTIPLE MEMORY-MULTIPLE PROCESSOR SYSTEM

[75] Inventor: Peter Washington, Little Mountain, S.C.

[73] Assignee: NCR Corporation, Dayton, Ohio

[21] Appl. No.: 764,400

[22] Filed: Dec. 11, 1996

[51] Int. Cl.⁶ .................................................. G06F 12/02
[52] U.S. Cl. .......................................... 711/148; 711/154
[58] Field of Search ................................... 711/147, 148, 711/154, 150

[56] References Cited

U.S. PATENT DOCUMENTS

| | | | |
|---|---|---|---|
| 4,495,567 | 1/1985 | Treen | 364/200 |
| 4,639,864 | 1/1987 | Katzman et al. | 395/182.12 |
| 4,703,422 | 10/1987 | Kinoshita et al. | 364/200 |
| 4,761,737 | 8/1988 | Duvall et al. | 711/209 |
| 4,764,865 | 8/1988 | Temple, III | 711/150 |
| 5,043,873 | 8/1991 | Muramatsu et al. | 711/119 |
| 5,055,999 | 10/1991 | Frank et al. | 364/200 |
| 5,237,673 | 8/1993 | Orbits et al. | 395/425 |
| 5,247,629 | 9/1993 | Casamatta et al. | 395/400 |
| 5,287,485 | 2/1994 | Umina et al. | 395/425 |
| 5,493,663 | 2/1996 | Parikh | 395/486 |
| 5,584,010 | 12/1996 | Kawai et al. | 711/117 |

Primary Examiner—Tod R. Swann
Assistant Examiner—Christopher S. Chow
Attorney, Agent, or Firm—Steven J. Adamson

[57] ABSTRACT

An apparatus and method for controlling the location of pages in a system having multiple processors and multiple main memory. Local and remote accesses to main memory are monitored and when remote accesses exceed local accesses in a predefined period, steps to alleviate the volume of remote accesses are undertaken. The steps may result in the relocation of a memory page, replication of a memory page (for read only pages) and relocation of a process.

15 Claims, 3 Drawing Sheets

REMOTE MEMORY, LANS, ETC.

MEMORY PAGE LOCATION CONTROL FOR MULTIPLE MEMORY-MULTIPLE PROCESSOR SYSTEM

FIELD OF THE INVENTION

The present invention relates to memory page location in systems having multiple main memories. More specifically, the present invention relates to the efficient allocation of such pages.

BACKGROUND OF THE INVENTION

Computer systems having multiple processors each with an associated main memory are known in the art and include the class of computer referred to as non-uniform memory access (NUMA) machines.

When a processor in one of these systems requires data from an external memory, for example, a magnetic or optical disk, a call is made to that memory and the requested data is loaded into the main memory of the requesting processor. If the same data is needed by a second processor, then a remote access over the system bus is performed by the second processor to read the data from the main memory of the first processor. If the subject data is required more often by the second processor than the first processor, then system performance is degraded by requiring the second processor to continually perform a remote access, and not transferring the data to the main memory of the second processor. Failure to recognize that the requested data is read only and may therefore be copied to the main memory of the second processor also degrades performance.

SUMMARY OF THE INVENTION

Accordingly, it is an object of the present invention to provide a method and apparatus for efficiently controlling the location of memory pages in multiple-processor, multiple-main memory computer systems.

It is another object of the present invention to provide such a method and apparatus that can determine whether a page in memory is being more frequently accessed by a remote processor than by a local processor.

It is another object of the present invention to provide such a method and apparatus that replicates read only memory pages to the main memory of a requesting processor.

It is also an object of the present invention to provide such a method and apparatus that can determine remote versus local accesses for a subset of main memory.

These and related objects of the present invention are achieved by use of apparatus and method for memory page location for a multiple memory-multiple processor system disclosed herein.

In one embodiment of the present invention, an apparatus is provided that comprises: first and second processors respectively coupled to first and second main memories and first and second memory control means; a system bus coupled to the first and second memory control means; means in the first memory control means for determining when a number of accesses to a memory location in the first memory from a process in the second processor is greater than a number of accesses to the memory location from the first processor; and means in communication with the determining means for moving either the memory page at the subject memory location or the process in the second processor, when the number of accesses by the process exceeds those from the first processor, such that after moving the memory page is provided in the main memory paired with the one of the first and second processors in which the process is now resident. The moving means may include relocating the memory page, replicating the memory page if it is read only, or relocating the process.

Logic is also provided for developing a histogram that has memory locations in the first main memory which are accessed from the second processor along one axis and a number of such accesses along another axis. The histogram is analyzed to determine if a number of accesses to a memory location in the histogram exceed a threshold value. The moving means is invoked if the threshold value has been exceeded.

In a hot page mode of access analysis, a fast access scanning memory smaller in size than the first main memory is provided and this memory is utilized in scanning a subset of the first main memory for accesses from the second processor.

In another embodiment of the present invention, an apparatus is provided that comprises: first and second processors respectively coupled to first and second main memories and first and second memory control means; a system bus coupled to the first and second memory control means; means in the first memory control means for determining when a number of accesses to a memory location in the first main memory from the second processor is greater than a number of accesses to the memory location from the first processor in a predefined period; and means in communication with the determining means for moving the memory page at that memory location from the first main memory to the second main memory when the number of accesses to that memory location from the second processor exceeds those from the first processor in the predefined period. Non read only memory pages are relocated, while read only pages are replicated. This embodiment may provide histogram and/or hot page mode operation, discussed herein.

The present invention also includes a method embodiment. The method embodiment provides steps analogous to the features achieved by the apparatus embodiments.

The attainment of the foregoing and related advantages and features of the invention should be more readily apparent to those skilled in the art, after review of the following more detailed description of the invention taken together with the drawings.

DETAILED DESCRIPTION

The physical layout of components which make up the present invention are discussed first followed by a description of operation.

Figure 1:
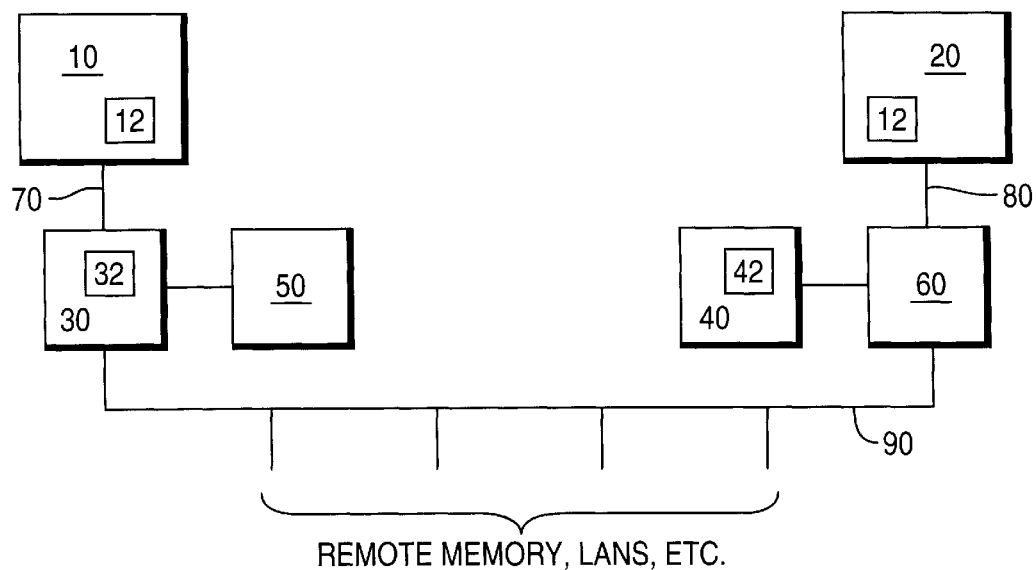
FIG. 1 is a block diagram of a multiple processor-multiple memory system incorporating page location control in accordance with the present invention.

Referring to FIG. 1, a block diagram of a multiple processor-multiple memory system incorporating page location control in accordance with the present invention is shown. The system includes a first processor or processor cluster 10 and a second processor or processor cluster 20. These processors 10,20 are respectively coupled to first and second advanced memory controllers (AMCs) 30,40 which are respectively connected to first and second fast access main memories 50,60. Processors 10,20 are connected to their respective AMCs via local buses 70,80 and AMCs 30,40 are interconnected by a system bus 90. The system bus 90 permits access to remote memory, LANs and the like. Main memories 50,60 are configured as one contiguous memory and address blocks may be arranged either sequentially or in an interleaved manner.

Processors 10,20 each contain memory management logic 12,22 which communicates with further memory management control logic 32,42 in AMCs 30,40. Logic 12,22,32,42 consists of hardware and software for performing the operations discussed below. Logic 12,22 includes the operating system of processors 10,20, respectively, and the CPUs of those processors. Logic 32,42 is discussed in more detail below with reference to FIGS. 2–4.

Figure 2:
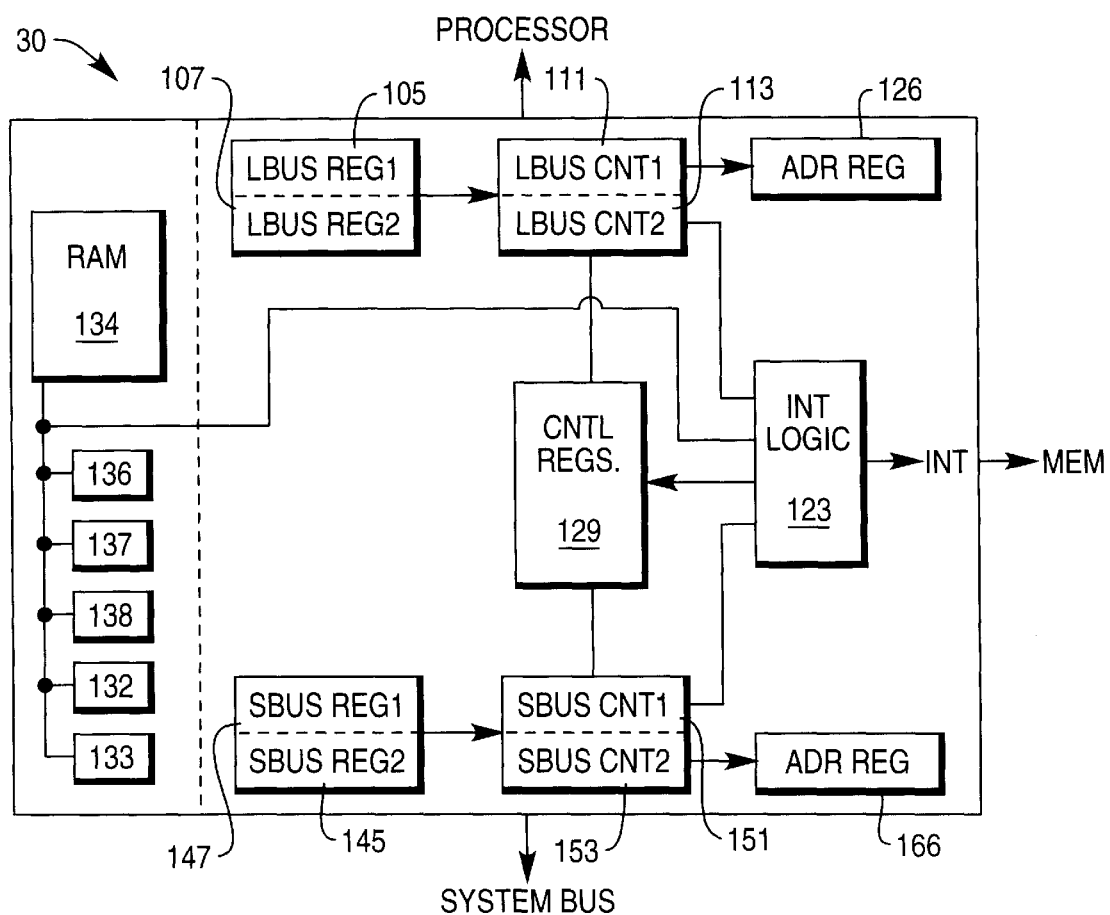
FIG. 2 is a block diagram of a memory management controller in accordance with the present invention.

Referring to FIG. 2, a block diagram of control logic within AMCs 30,40 in accordance with the present invention is shown. This block diagram represents the hardware component of the memory control logic 32,42 and since the AMCs 30,40 are functionally equivalent, only AMC 30 is discussed.

AMC 30 is preferably an application specific integrated circuit (ASIC) of the type provided by VLSI of San Jose, Calif., and is comprised of a plurality of registers and counters. The registers include first and second local bus control registers 105,107, first and second system bus control registers 145,147, common control registers 129 and local bus and system bus address registers 126,166. The counters include first and second local bus counters 111,113 and first and second system bus counters 151,153. Interrupt control logic for generating an interrupt to processor 10 is also provided. These components are utilized in several operations including a memory evaluation mode termed histogram mode, discussed below. The multiplicity of remote and local bus counters also permits multiple comparison/evaluation operations.

AMC 30 also includes a fast access RAM 134. In a preferred embodiment, the RAM is static RAM (SRAM) and has a size of 512K bytes. RAM 134 is utilized in a memory evaluation mode termed hot page mode which is discussed in more detail below. A plurality of components operate in conjunction with RAM 134 and these include a range register 136, an address register 137, a hot page control register 138, a maximum count register 132 and an interval counter.

Operation of these components to achieve the memory page management of the present invention is now presented.

Processors 10,20 access data in memories 50,60 which as noted above are preferably configured such that they form one contiguous memory. When data required by processor 10 is in memory 60 (or when data required by processor 20 is in memory 50) a remote (system bus) memory access requiring a system bus cycle is required. While this cycle is faster than remote access to a disk drive or the like, it is slower than direct access from a processor to its paired memory. If the data in the non-paired memory is required frequently, then system performance is significantly degraded by the remote accesses. For purposes of the present discussion, system bus memory accesses (i.e., non-paired memory accesses) will be referred to as remote accesses, while paired memory accesses will be referred to as local accesses.

The present invention performs an evaluation of local or remote accesses and provides a plurality of alternatives when remote accesses exceed local accesses for a particular page of memory. These alternatives include relocation of the page to the memory of the requesting processor, copying the page to the requesting processor if the page is read only and switching the process requesting the data to the processor associated with the memory where the data is resident, if appropriate. As alluded to above, the present invention is capable of operation in at least two modes. The first mode is histogram mode in which a histogram is constructed of the number of remote accesses for a specific memory location in a predefined time period. The second mode is hot page mode in which memory is continually scanned in blocks of a predefined size to determine if the number of remote accesses to a page within a block exceeds a threshold value in a set time period. Though hot page mode is advantageous in that it generates fewer interrupts, histogram mode scans larger amounts of memory.

Figure 3:
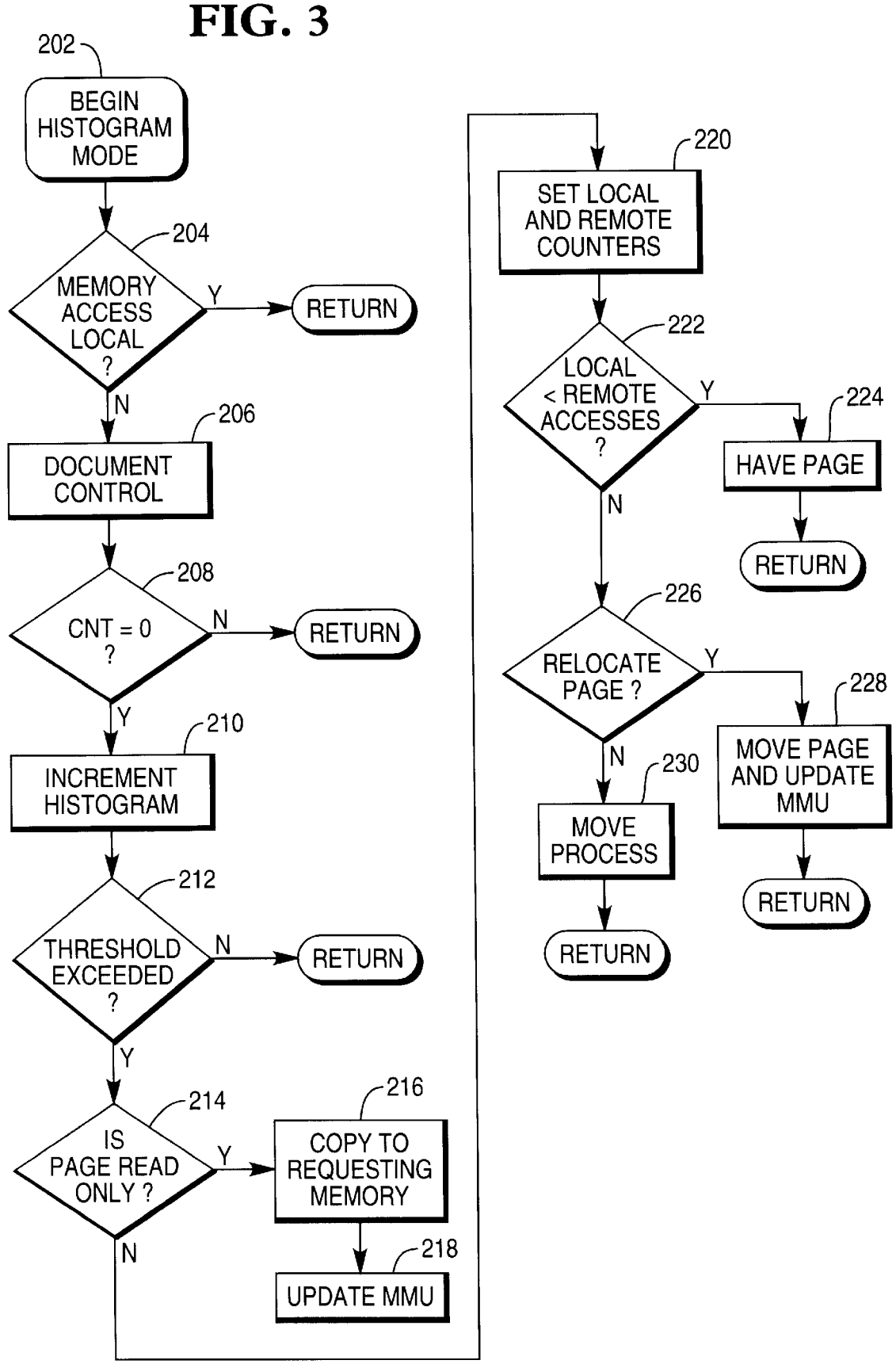
FIG. 3 is a flow diagram for operation of the memory control logic in histogram mode in accordance with the present invention.
Figure 4:
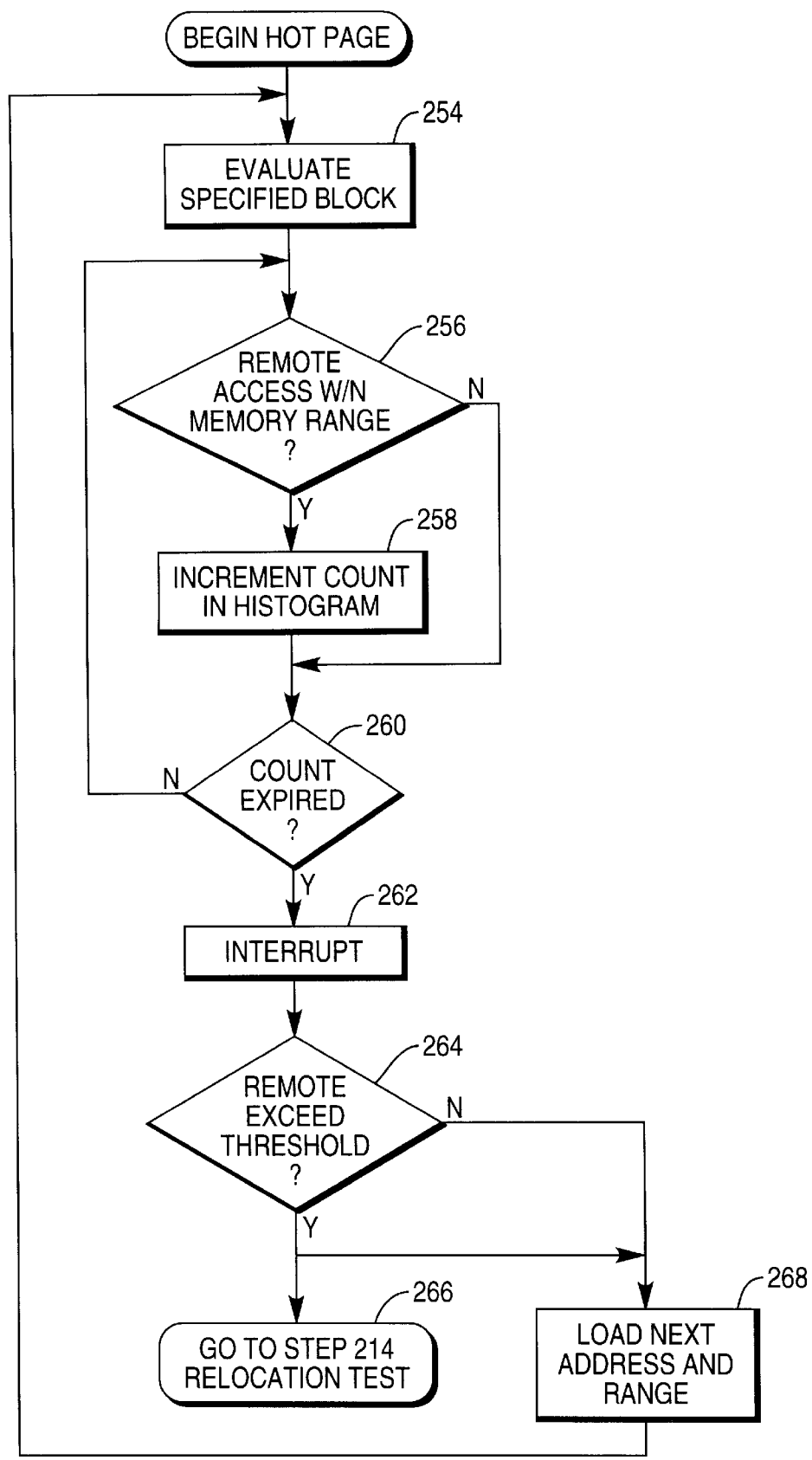
FIG. 4 is a flow diagram for operation of the memory control logic in hot page mode in accordance with the present invention.

Referring to FIG. 3, a flow diagram for operation of the memory control logic 12,22,32,42 in histogram mode in accordance with the present invention is shown. Software for executing the flow diagram of FIG. 3 is part of the operating system of processor 10 (and 20) and operates in conjunction with the control registers and counters of the AMC(s).

At step 202, histogram mode is begun with creation of a histogram in processor memory with the number of remote accesses on the y-axis and address locations on the x-axis. A threshold count for the number of remote accesses to merit an interrupt is loaded into counter 151. The threshold value may be, for example, 50 meaning that on every fiftieth remote access an interrupt is generated and the address of the fiftieth remote access is stored.

Step 204 indicates a memory access and the determination of whether the access is local or remote. If remote, the value in counter 111 is decremented (step 206). If, in step 208, the count in counter 151 is zero, then the address causing the interrupt (latched at system address register 166) is added to the histogram, if not already there, and the number of interrupts generated by that address is incremented (step 210). If the counter value does not equal zero, then flow is returned.

If, in step 212, the number of remote accesses for an address exceeds the threshold number in a predefined time, then further analysis of the demand for that address location is undertaken. It will be recognized that the threshold number of accesses and the predefined time will vary in a known manner depending on the configuration of a system, desired performance and processor speed. At step 214, a determination is made as to whether the requested page is read only. If it is, then the requested page is copied to the requesting memory (step 216) and the MMU table of the system is updated to point to the new, copied page (step 218).

When data at the requested memory location is not read only, a determination is made as to whether local accesses exceed remote accesses. This determination is made by loading the address of interest into an address register in block 129 and setting counter 113 and 153 to respectively count the number of local and remote accesses in a predefined time period for that address (step 220).

If more than two AMCs are present in a system, the number of accesses to the subject location by other processors can be obtained by interrogating the AMCs associated with those processors. For example, if there are 4 processor-memory pairs and thus 4 AMCs, say A,B,C,D, it is possible that AMC A may make 40 access to a local memory location while AMCs B–D each make 20 accesses to that same location. In total the number of remote accesses (3×20=60) is greater than the number of local accesses (40). Upon investigation of AMCs B–D, however, it becomes evident that the requested data is most efficiently located in the memory of AMC A.

Referring to step 222, if local accesses exceed remote accesses, then the page is not moved (step 224). If, however, remote accesses exceed local accesses, then a determination is made as to whether it is most efficient to relocate the page or to relocate the requesting process to the processor proximate the memory in which the page is resident (step 226). One scenario in which process transfer may be preferred is when movement of the memory requested by the process would result in a greater number of remote accesses by other AMCs (in a system with 3 or more AMCs) after movement of the page(s). If relocation of the process is not warranted, then the page is moved and the system MMU updated (step 228). Step 230 represents movement of the process.

Referring to FIG. 5, a flow diagram for operation of the memory control logic in hot page mode in accordance with the present invention is shown. In step 252, the hot page mode is begun. When a hot page enabled bit in the hot page control register 138 is set, the SRAM 134 is used to monitor all accesses within a range specified by range register 136 and starting at an address specified in address register 137. A histogram for the block is also created in system memory. When an auto index bit in register 138 is set, the memory control logic begins to automatically sequence through RAM 134 for a time period specified by interval timer 133.

In step 256, a determination is made as to whether a remote memory access has occurred within the specified memory range. If it has, an entry in the histogram for the address which caused the remote access is incremented (step 258). In step 260, a determination is made as to whether the time period of timer 133 has expired. If it has, an interrupt is generated (step 262) and the histogram is analyzed to determine whether the number of remote access for any memory location within the specified range has exceeded the threshold number of stored in maximum count register 132 (step 264). If the threshold is exceeded at any address, flow is transferred to step 214 of FIG. 3. At step 214, each of the address locations in the hot page histogram that where in excess of the threshold remote access number are evaluated for replication or relocation as discussed above for location in excess of the threshold number in histogram mode.

From step 264, process flow continues to step 268 where the next starting address and range to investigate are loaded into the appropriate registers and evaluation of this new block is begun at step 254.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A computer system, comprising:

first and second processors respectively coupled to first and second main memories and first and second memory control means;

a system bus coupled between said first and second memory control means and said first and second main memories;

means for determining when a process in said second processor is accessing said first memory more often than said second memory; and means in communication with said determining means for moving a process in said second processor to said first processor when the number of accesses by that process to said first memory exceeds those by that process to said second memory.

2. The system of claim 1, further comprising:

means for determine when a number of accesses to a memory location in said first memory from said second processor is greater than a number of accesses to that memory location from said first processor; and means in communication with said memory page determining means for moving a memory page at that memory location from said first memory to said second memory when a number accesses by said second processor is greater than a number of accesses by said first processor.

3. The system of claim 2, wherein said moving means comprises:

means for determining when the memory page is a read only memory page;

means for replicating such a read only memory page to produce a replicated read only memory page; and means for providing the replicated read only memory page in said second main memory.

4. The system of claim 1, further comprising logic means for developing a histogram having memory locations in said first main memory that are accessed by processes in said second processor along one axis and a number of such accesses along another axis.

5. The system of claim 4, further comprising:

means for analyzing said histogram and determining if a number of accesses to a memory location in said histogram exceed a threshold value; and means for invoking said moving means when said threshold value is exceeded.

6. The system of claim 1, wherein said first memory control means comprises:

a fast access scanning memory smaller in size than said first main memory; and means for scanning a subset of said first main memory approximately equal in size to said scanning memory for accesses by processes in said second processor.

7. A computer system, comprising:

first and second processors respectively coupled to first and second main memories and first and second memory control means;

a system bus coupled between said first and second memory control means and said first and second main memories;

means for determining when a number of accesses to a memory location in said first main memory from said second processor is greater than a number of accesses to that memory location from said first processor in a defined period; and means in communication with said determining means for moving the memory page at that memory location from said first main memory to said second main memory when the number of accesses to that memory location from said second processor exceeds those from said first processor in the defined period.

8. The system of claim 7, moving means comprises means for relocating the memory page from further comprising:

means for determining when a process in said second processor is accessing said first memory more often than said second memory; and means in communication with said determining means for moving a process in said second processor to said first processor when the number of accesses by said process to said first memory exceeds those to said second memory.

9. The system of claim 7, wherein said moving means comprises:

means for determining when the memory page is a read only memory page;

means for replicating such a read only memory page to produce a replicated read only memory page; and means for providing the replicated read only memory page in said second main memory.

10. The system of claim 7, further comprising:

logic means for developing a histogram having memory locations in said first main memory that are accessed from said second processor along one axis and a number of such accesses along another axis;

means for determining if a number of accesses to a memory location in said histogram exceed a threshold value; and means for invoking said moving means when said threshold value is exceeded.

11. The system of claim 7, wherein said first memory control means comprises:

a fast access scanning memory smaller in size than said first main memory; and means for scanning a subset of said first main memory approximately equal in size to said scanning memory for accesses from said second processor.

12. A method for controlling memory page location, comprising the steps of:

providing first and second processors respectively coupled to first and second main memories and first and second memory control means;

providing said first and second main memories such that they are coupled to one another;

determining when a number of accesses to a memory location in said first main memory from said second processor is greater than a number of accesses to that memory location from said first processor in a defined period; and moving the memory page at that memory location from said first main memory to said second main memory when the number of accesses to that memory location from said second processor exceeds those from said first processor in the defined period.

13. The method of claim 12, wherein the moving step comprises the steps of:

determining when the memory page is a read only memory page;

replicating such a read only memory page to produce a replicated read only memory page; and providing the replicated read only memory page in said second main memory.

14. The method of claim 12, further comprising the steps of:

developing a histogram having memory locations in said first main memory that are accessed from said second processor along one axis and the number of such accesses along another axis;

determining if the number of accesses to a memory location in said histogram exceed a threshold value; and invoking said moving step when said threshold value is exceeded.

15. The system of claim 12, further comprising the steps of:

providing a fast access scanning memory smaller in size than said first main memory; and scanning a subset of said first main memory approximately equal in size to said scanning memory for accesses from said second processor.

* * * * *